(12) United States Patent
Panjer

(10) Patent No.: US 11,390,384 B2
(45) Date of Patent: Jul. 19, 2022

(54) GALLEY INSERT MOTOR HAVING DYNAMIC SEAL ON EXTERIOR OF MOTOR HOUSING

(71) Applicant: KONINKLIFKE FABRIEK INVENTUM B.V., Nieuwegein (NL)

(72) Inventor: Frederik A. S. Panjer, Maarsbergen (NL)

(73) Assignee: Koninklifke Fabriek Inventum B.V., Nieuwegein (NL)

( * ) Notice: Subject to any disclaimer, the term of this patent is extended or adjusted under 35 U.S.C. 154(b) by 216 days.

(21) Appl. No.: 16/818,657

(22) Filed: Mar. 13, 2020

(65) Prior Publication Data

US 2021/0284339 A1   Sep. 16, 2021

(51) Int. Cl.
*B64D 11/04* (2006.01)
*B64D 41/00* (2006.01)
*H02K 7/08* (2006.01)
*H02K 7/14* (2006.01)
*H02K 5/10* (2006.01)

(52) U.S. Cl.
CPC ............ *B64D 11/04* (2013.01); *B64D 41/00* (2013.01); *H02K 5/10* (2013.01); *H02K 7/083* (2013.01); *H02K 7/14* (2013.01)

(58) Field of Classification Search
CPC .......... B64D 11/04; B64D 41/00; H02K 5/10; H02K 7/083; H02K 7/14
USPC ......................................................... 310/88
See application file for complete search history.

(56) References Cited

U.S. PATENT DOCUMENTS

| | | | |
|---|---|---|---|
| 3,378,709 A * | 4/1968 | Lewis .................... | H02K 15/16 310/90 |
| 4,458,140 A | 7/1984 | Belinkoff | |
| 6,081,082 A * | 6/2000 | Kim ........................ | H02M 7/60 310/129 |
| 6,210,033 B1 * | 4/2001 | Karkos, Jr. .............. | H02K 7/11 366/274 |
| 6,247,702 B1 | 6/2001 | Long et al. | |
| 6,881,938 B2 * | 4/2005 | Kim ..................... | H05B 6/6476 219/757 |
| 8,642,928 B2 | 2/2014 | Schulte | |

(Continued)

FOREIGN PATENT DOCUMENTS

| | | |
|---|---|---|
| EP | 3580496 A1 | 12/2019 |
| GB | 711775 A | 7/1954 |

(Continued)

*Primary Examiner* — Terrance L Kenerly
(74) *Attorney, Agent, or Firm* — Suiter Swantz pc llo

(57) ABSTRACT

A system may include an aircraft galley insert; an aircraft galley insert motor mount; and an aircraft galley insert motor. The aircraft galley insert motor may include: a motor housing; a dynamic seal seat extending from an exterior of the motor housing toward the aircraft galley insert motor mount; a dynamic seal installed within the dynamic seal seat and on the exterior of the motor housing, the dynamic seal preventing matter from an inner cavity from entering an interior of the motor housing; and a shaft driven by the aircraft galley insert motor, the shaft extending from within the aircraft galley insert motor, through the motor housing, through the dynamic seal, and into the inner cavity of the aircraft galley insert, wherein the dynamic seal forms a seal around the shaft as the shaft is driven and as the shaft is deflected at least by gravity effects, turbulence, and vibrations.

17 Claims, 13 Drawing Sheets

(56) References Cited

U.S. PATENT DOCUMENTS

| | | |
|---|---|---|
| 8,692,162 B2 | 4/2014 | Elston et al. |
| 9,089,005 B2 | 7/2015 | Boedicker et al. |
| 2004/0089648 A1 | 5/2004 | Griffey et al. |
| 2017/0025921 A1* | 1/2017 | Kirker .................... H02K 5/00 |
| 2017/0265684 A1* | 9/2017 | Roberts ............... A47J 43/0716 |

FOREIGN PATENT DOCUMENTS

| | | |
|---|---|---|
| GB | 721544 A | 1/1955 |
| GB | 858174 A | 1/1961 |
| GB | 1454594 A | 11/1976 |

* cited by examiner ial fan and the motor of the system

GALLEY INSERT MOTOR HAVING DYNAMIC SEAL ON EXTERIOR OF MOTOR HOUSING

BACKGROUND

In current designs, a dynamic seal and motor shaft can be become misaligned due to deflection of the motor shaft and arrangement of dynamic seal components. If the dynamic seal and shaft are misaligned, the dynamic seal can wear out rapidly, which can cause motor failure by exposing motor components to a cooking environment of an oven. Misalignment and deflection can accelerate a rate at which the dynamic seal wears out, shorten the dynamic seal's service life, and result in pressure leaks. Additionally, to replace a worn-out dynamic seal on some existing galley insert motors, a motor housing has to be removed and the motor disassembled, which makes it difficult and time consuming to replace the dynamic seal.

SUMMARY

In one aspect, embodiments of the inventive concepts disclosed herein are directed to a system. The system may include an aircraft galley insert having a rear side of a structure of the aircraft galley insert that comprises in an inner cavity; an aircraft galley insert motor mount installed on the rear side of the aircraft galley insert; and an aircraft galley insert motor installed on the aircraft galley insert motor mount. The aircraft galley insert motor may include: a motor housing; a dynamic seal seat extending from an exterior of the motor housing toward the aircraft galley insert motor mount; a dynamic seal installed within the dynamic seal seat and on the exterior of the motor housing, the dynamic seal preventing matter from the inner cavity from entering an interior of the motor housing; and a shaft driven by the aircraft galley insert motor, the shaft extending from within the aircraft galley insert motor, through the motor housing, through the dynamic seal, and into the inner cavity of the aircraft galley insert, wherein the dynamic seal forms a seal around the shaft as the shaft is driven and as the shaft is deflected at least by gravity effects, turbulence, and vibrations.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
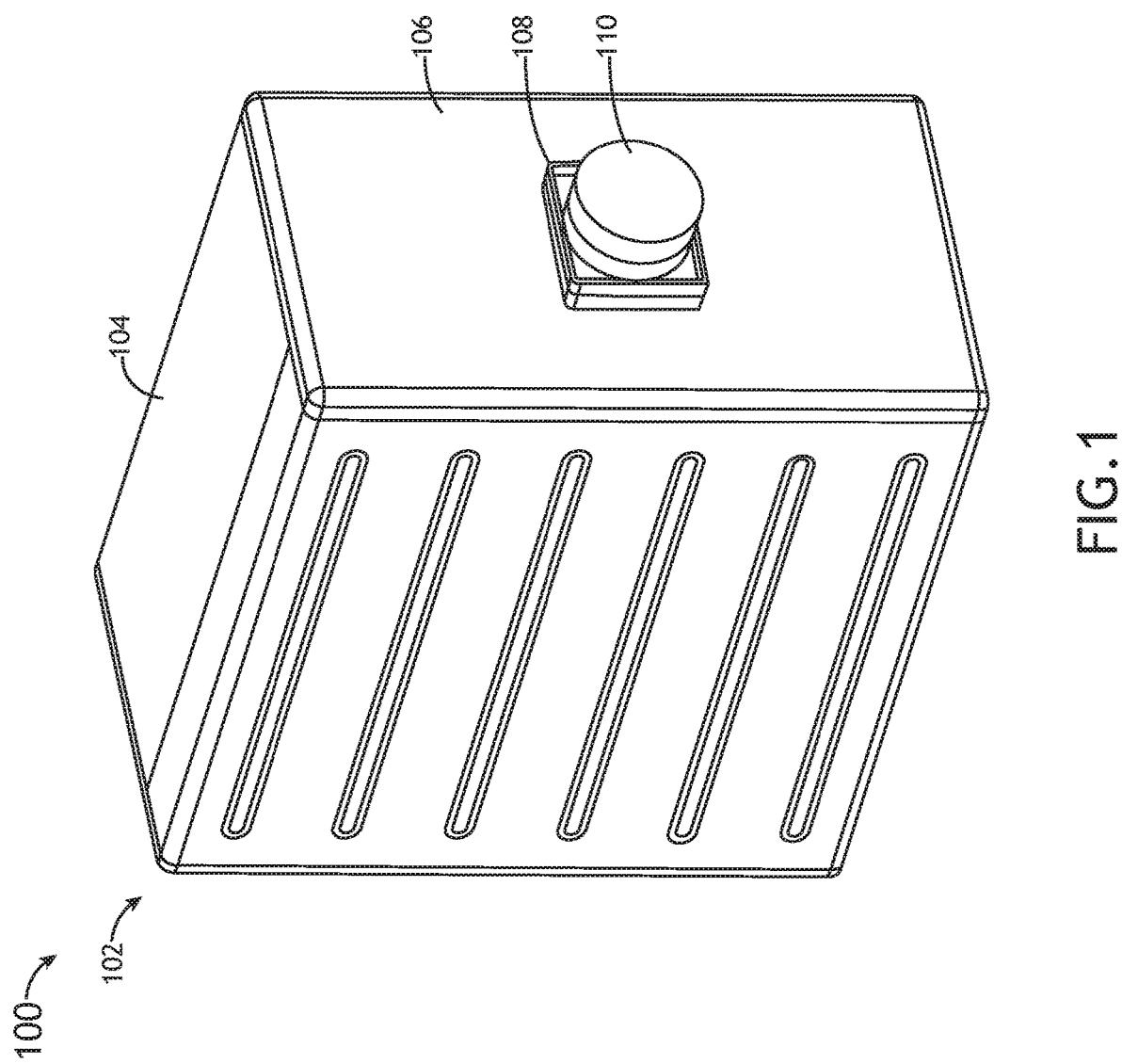
FIG. 1 is a view of an exemplary embodiment of a system including a vehicle including a galley insert in according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1*a*, 1*b*). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following:

A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a method of installing, replacing, and/or removing a dynamic seal and a system including a galley insert motor having a dynamic seal installed within a dynamic seal seat and on an exterior of a motor housing. In some embodiments, an alignment between a motor shaft and the dynamic seal can be improved by mounting the dynamic seal on an exterior of the motor housing, which allows for ease of installation, replacement, and servicing. Additionally, with the dynamic seal on the exterior of the motor housing, the motor can be directly mounted to an inner oven cavity (e.g., an area in which the meals are prepared and that contains the cooking environment), which can reduce a number of parts. Additionally, due to the location of the dynamic seal, realignment of the motor may not be necessary after the dynamic seal is serviced or replaced. Some embodiments may increase the dynamic seal's life, for example, due to improved alignment, may require less parts, and alignment may be maintained during service, installation, and removal of the motor from the aircraft galley insert.

Referring now to FIGS. 1-12, exemplary embodiments of a system including a vehicle (e.g., an automobile, a train, a watercraft, a submarine, or an aircraft 100) are depicted according to the inventive concepts.

Referring now to FIG. 1, for example, the vehicle (e.g., the aircraft 100) may include at least one galley (e.g., at least one aircraft galley 102), which may include one or more galley inserts (e.g., one or more aircraft galley inserts (e.g., aircraft galley insert ovens 104)) that may be installed within galley insert bays (e.g., aircraft galley insert oven bays). For example, each aircraft galley insert oven 104 may be generally shaped as a parallelpiped, which may have a front, a rear 106, a top, a bottom, and two sides.

Figure 2:
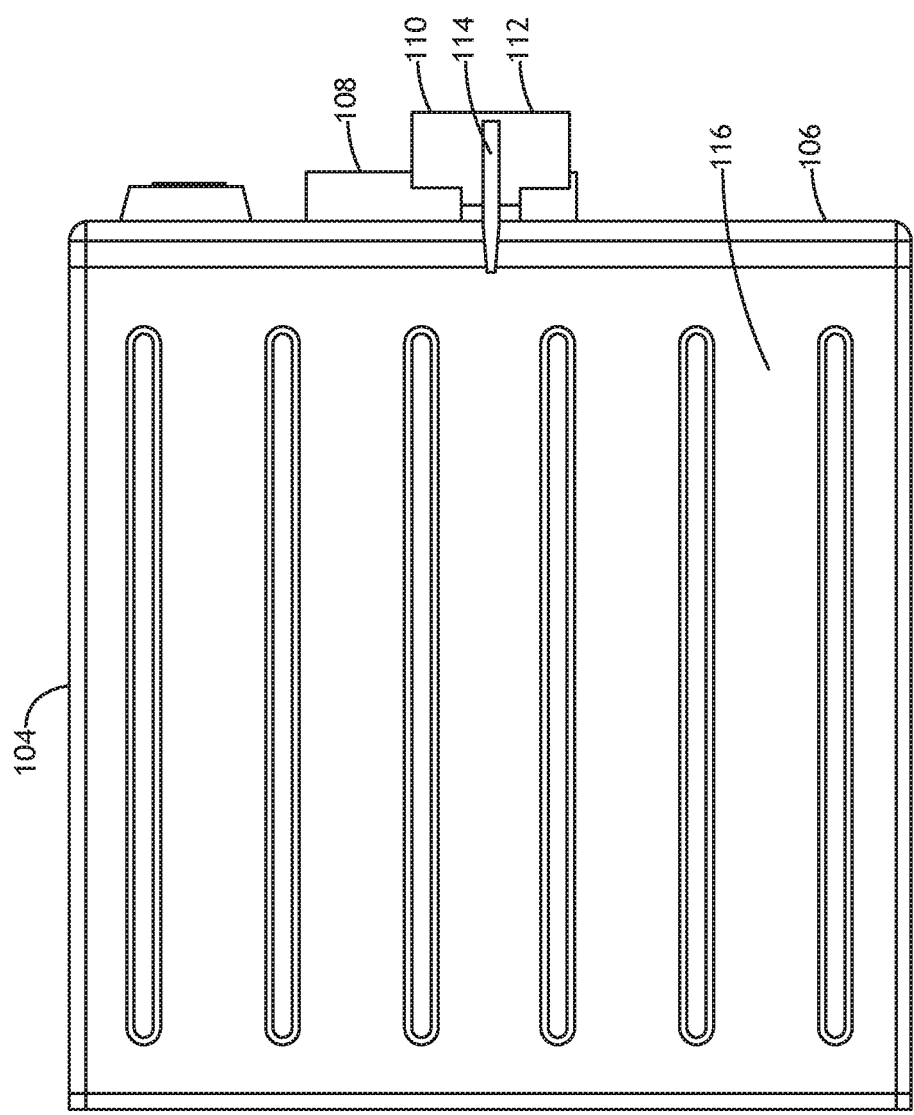
FIG. 2 is a cross-sectional view of an exemplary embodiment of the galley insert of the system of FIG. 1 according to the inventive concepts disclosed herein.

Referring now to FIG. 2, for example, the aircraft 100 may include an aircraft galley insert (e.g., an aircraft galley insert oven 104) having a rear side 106 of a structure of the aircraft galley insert that comprises in an inner cavity 116 (e.g., an oven cavity configured to contain a cooking environment), a motor mount (e.g., an aircraft galley insert motor mount 108) installed on the rear 106 of the galley insert (e.g., the aircraft galley insert (e.g., the aircraft galley insert oven 104)), and/or a galley insert motor (e.g., an aircraft galley insert motor 110) installed on the motor mount (e.g., the aircraft galley insert motor mount 108).

Figure 10:
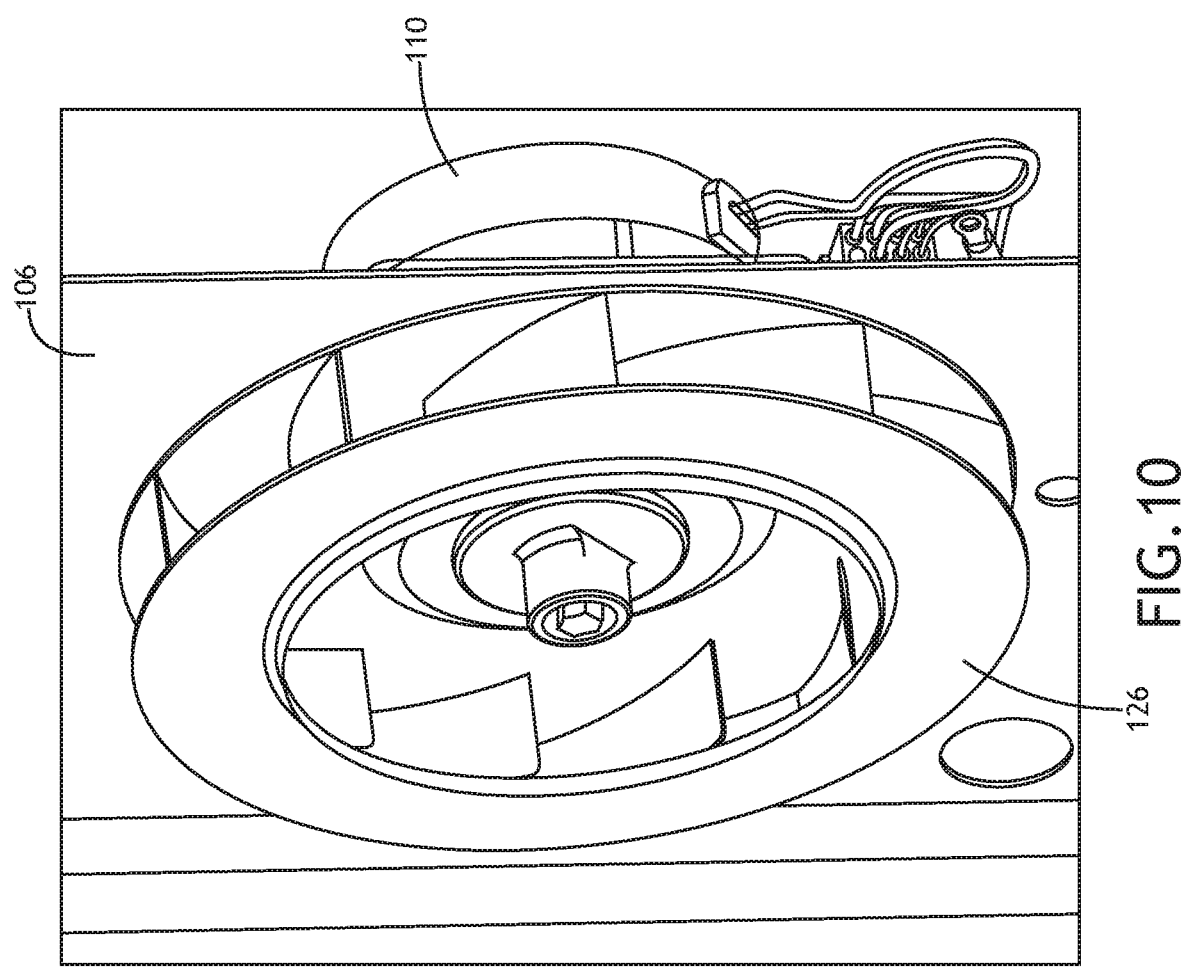
FIG. 10 is an isometric cross-sectional view of an exemplary embodiment of the motor of the system of FIG. 1 according to the inventive concepts disclosed herein.
Figure 11:
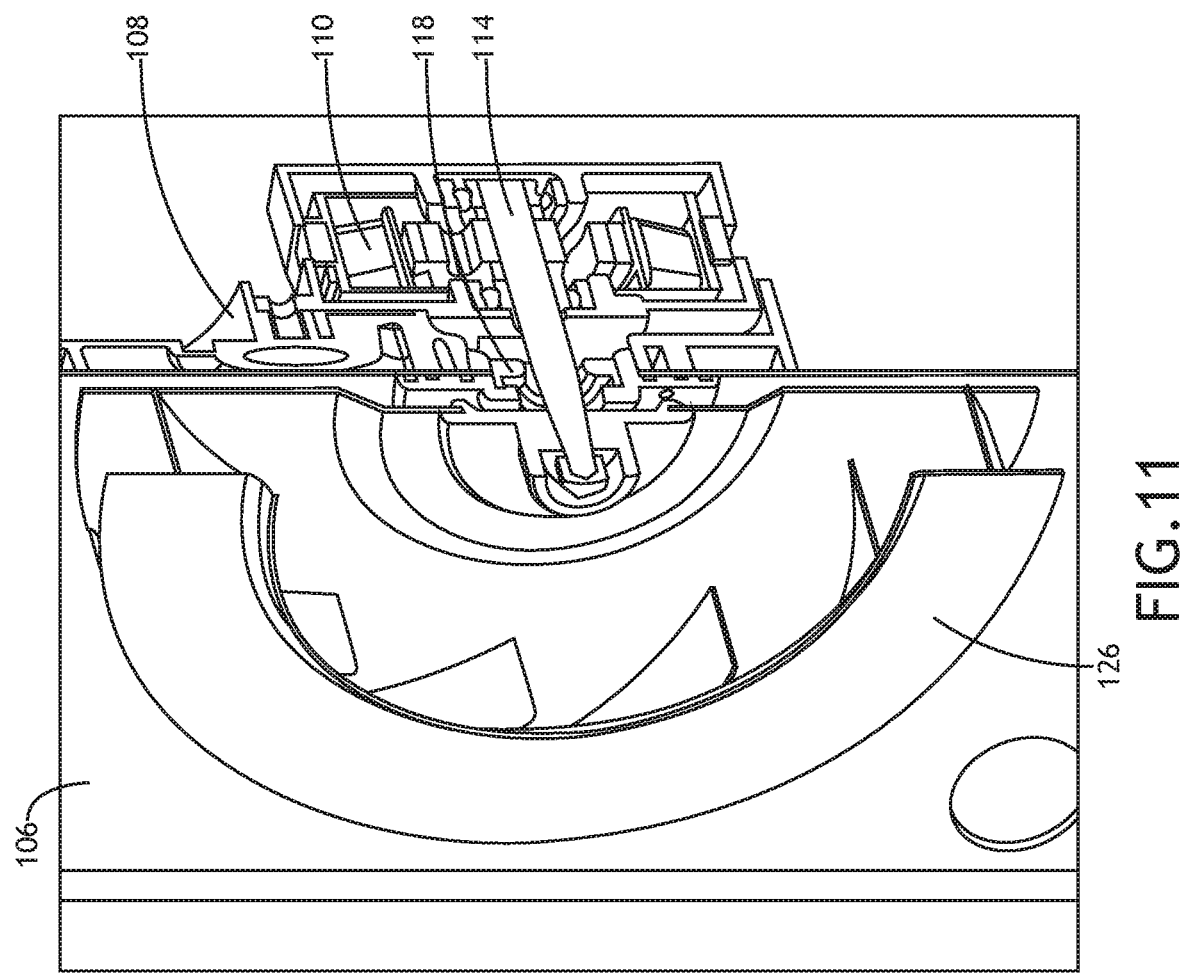
FIG. 11 is an isometric cross-sectional view of an exemplary embodiment of a radial fan and the motor of the system of FIG. 1 according to the inventive concepts disclosed herein.
Figure 12:
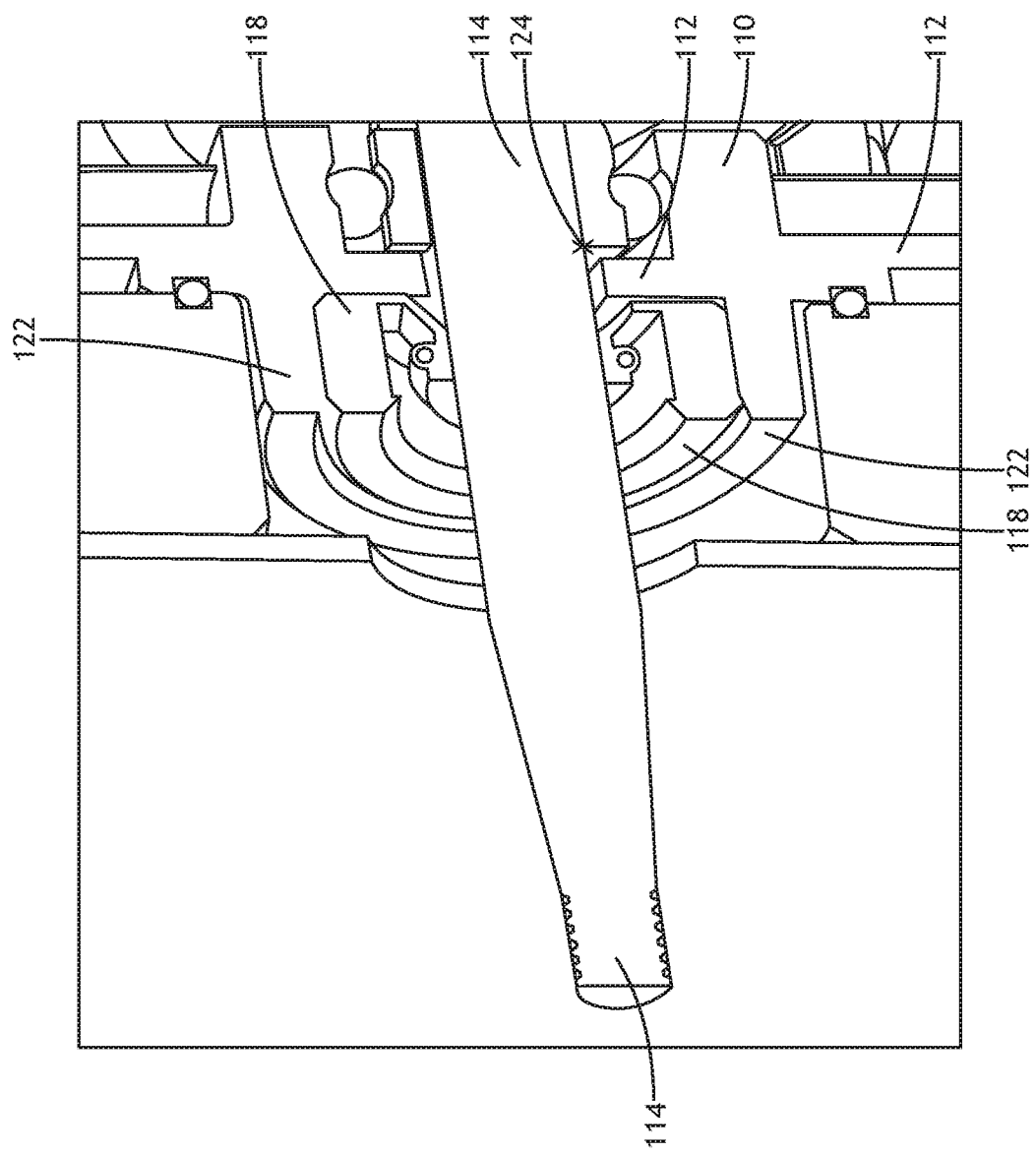
FIG. 12 is a cross-sectional view of an exemplary embodiment of the radial fan and the motor of the system of FIG. 1 according to the inventive concepts disclosed herein.
Figure 13:
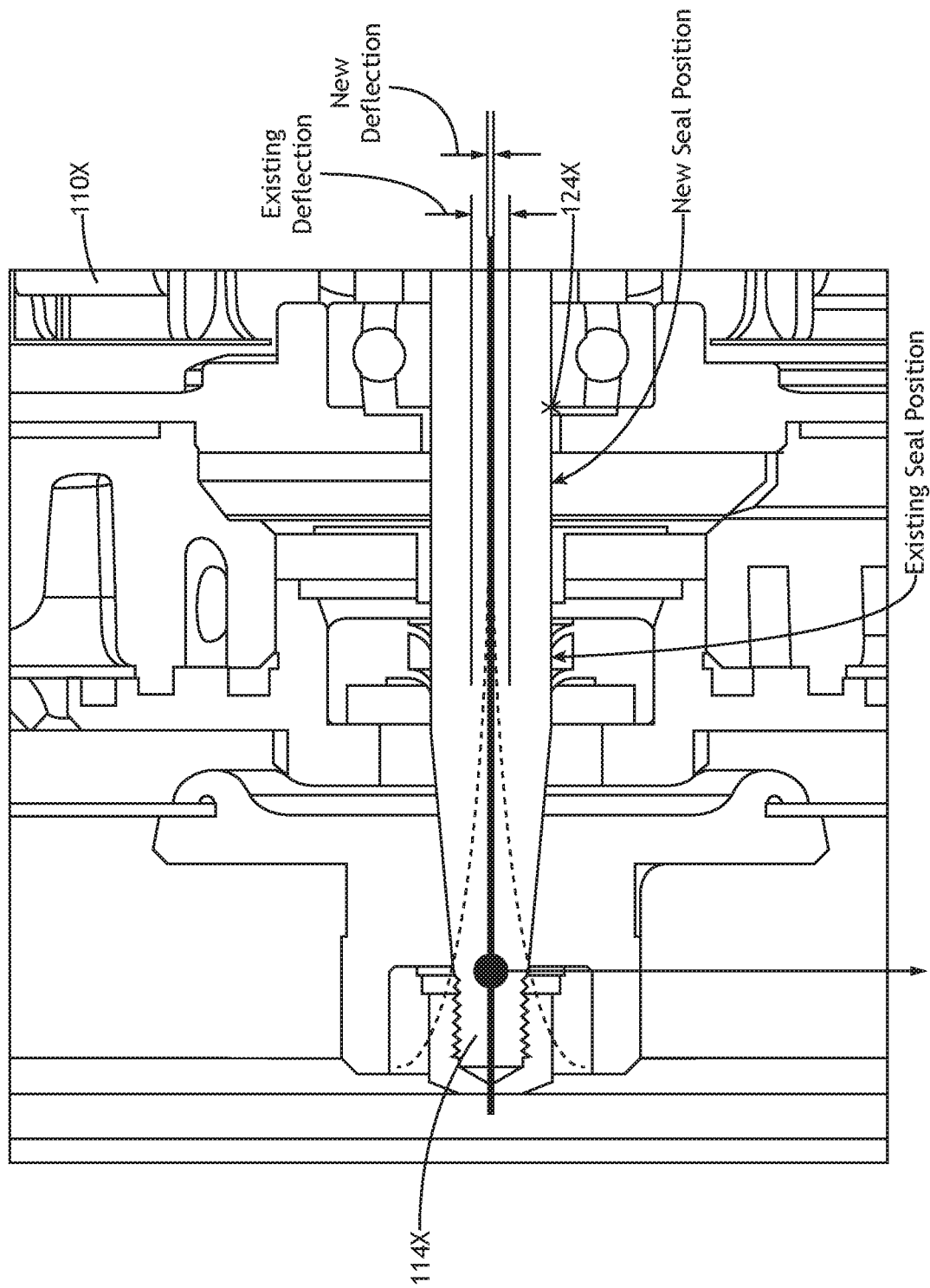
FIG. 13 is a cross-sectional view illustrating an amount of deflection of the shaft for an exemplary embodiment of FIG. 1 as compared to an existing motor's shaft according to the inventive concepts disclosed herein.

Referring now to FIGS. 2-12, in some embodiments, the aircraft galley insert motor 110 may drive a fan (as shown in FIGS. 10-11) within the aircraft galley insert oven 104. For example, the aircraft galley insert motor 110 may include: a motor housing 112 around internal components of the aircraft galley insert motor 110; a dynamic seal seat 122 extending from an exterior of the motor housing 112 toward the aircraft galley insert motor mount 108; a dynamic seal 118 installed within the dynamic seal seat 122 and on the exterior of the motor housing 122, the dynamic seal 118 preventing matter from the cavity 116 from entering an interior of the motor housing 112; and/or a shaft 114 driven by the aircraft galley insert motor 110, the shaft 114 extending from within the aircraft galley insert motor 110, through the motor housing 112, through the dynamic seal 118, and into the cavity 116 of the aircraft galley insert (e.g., the aircraft galley insert oven 104). The dynamic seal 118 may form a seal (e.g., a circumferential seal) around the shaft 114 as the shaft 114 is driven and as the shaft 114 is deflected at least by gravity effects (e.g., a weight of an object (e.g., a fan (e.g., a radial fan 126)) attached to an end of the shaft 114), turbulence (e.g., air turbulence impacting the aircraft 100), and vibrations (e.g., aircraft and/or equipment vibrations and/or turbulence caused vibrations). The aircraft galley insert motor 110 may have a bearing point 124 where the shaft 114 is subject to a dynamic bending load causing deflection of the shaft 114, wherein a distance between a closest portion of the dynamic seal 118 to the bearing point 124 is less than 25% (e.g., less than 15% (e.g., less than 12%)) of a distance between a tip of the shaft 114 and the bearing point 124 so as to reduce an amount of deflection of the shaft 124 against the dynamic seal 118 as compared to a configuration (e.g., including a motor 110X, a seal 118X, a shaft 114X, and a bearing point 124X, as shown in FIG. 13) with a differently positioned seal 118X positioned farther away from the bearing point 124X. The aircraft galley insert motor 110 may be an electric motor.

Referring to FIG. 2, in some embodiments, the aircraft galley insert motor mount 108 may provide structural support for installing the aircraft galley insert motor 110 on the aircraft galley insert oven 104.

Referring to FIGS. 3-9 and 12, in some embodiments, the dynamic seal seat 122 may be a circumferential wall extending from the exterior of the motor housing 112 toward the aircraft galley insert motor mount 108. The dynamic seal 118 may be positioned within the dynamic seal seat 122.

Referring to FIGS. 3-9 and 12, in some embodiments, the dynamic seal 118 may protect an interior of aircraft galley insert motor 110 from a cooking environment (e.g., which may include contaminants, moisture, steam, food particles, etc.) of the aircraft galley insert oven 104, which could otherwise enter into the aircraft galley insert motor 110 without the dynamic seal. An inner circumference of the dynamic seal 118 may be squeezed against the shaft 114. The dynamic seal 118 may allow for a specified amount of misalignment and/or deflection of the shaft 114 relative to the dynamic seal 118 while still maintaining a seal. In some embodiments, the dynamic seal 118 may be replaceable without opening the motor housing 112. In some embodiments, a method may include installing, replacing, and/or removing the dynamic seal 118 without opening the motor housing 112. For example, the dynamic seal 118 may form a seal around the shaft 114 as the shaft 114 is rotatably driven and as the shaft 114 is deflected. The dynamic seal 118 may be formed of a flexible material (e.g., rubber or silicone). In some embodiments, the dynamic seal 118 may have an outer circumference that abuts the dynamic seal seat 122 and an inner circumference forming an opening that surrounds and abuts the shaft 114. For example, the dynamic seal 118 may include several portions, such as any or all of the following: a portion 118A along the outer circumference that abuts the dynamic seal seat 122; an annular portion 118B positioned between the outer circumference and the inner circumference, wherein the annular portion 1186 is parallel to the rear 106 of the aircraft galley oven insert 104; an angled annular portion 118C positioned between the annular portion 1186 and the inner circumference, wherein the angled annular portion 118C is angled toward the rear 106 of the aircraft galley oven insert 104 as the angled annular portion 118C approaches the inner circumference; a perpendicular annular portion 118D positioned along the inner circumference, the perpendicular annular portion 118D extending perpendicularly toward the rear 106 of the aircraft galley oven insert 104; and/or a torus-shaped portion 118E positioned around the perpendicular annular portion 118D.

Figure 3:
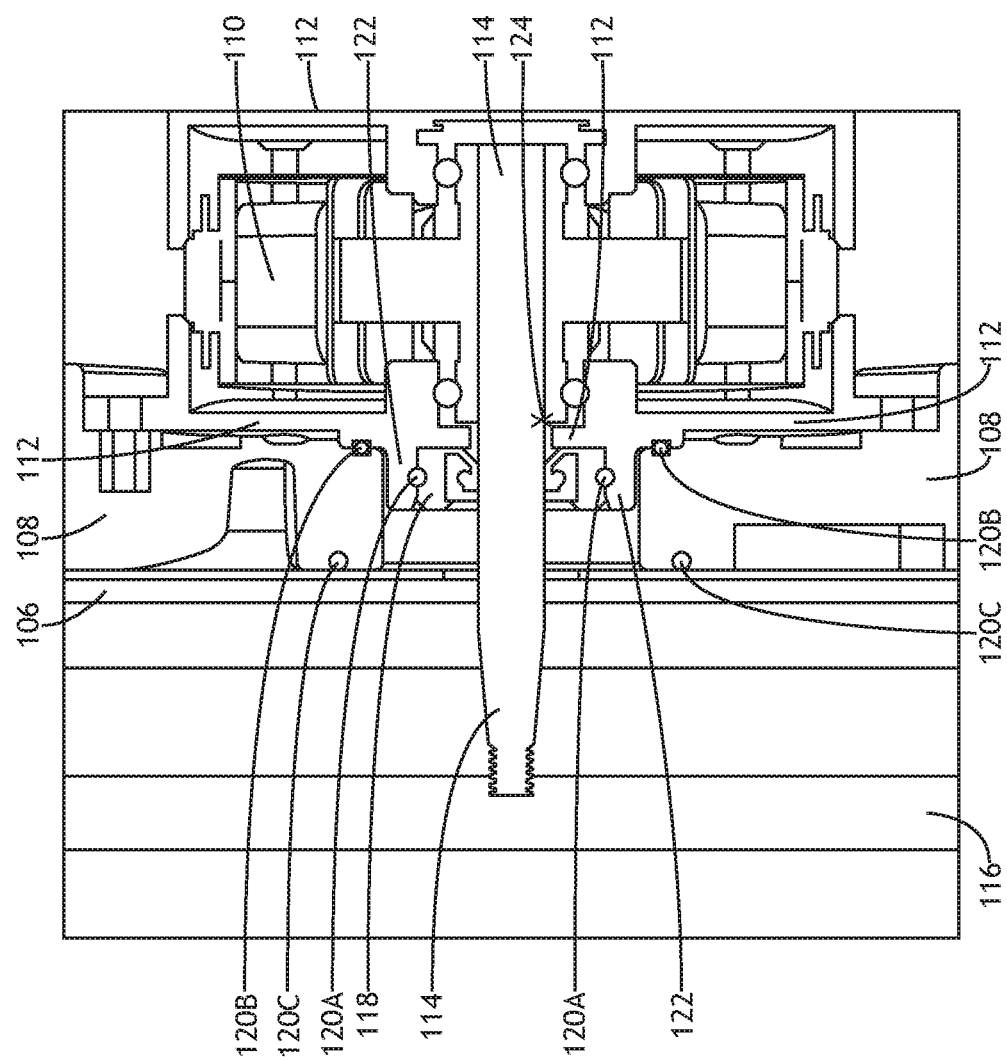
FIG. 3 is a cross-sectional view of an exemplary embodiment of the galley insert of the system of FIG. 1 according to the inventive concepts disclosed herein.
Figure 4:
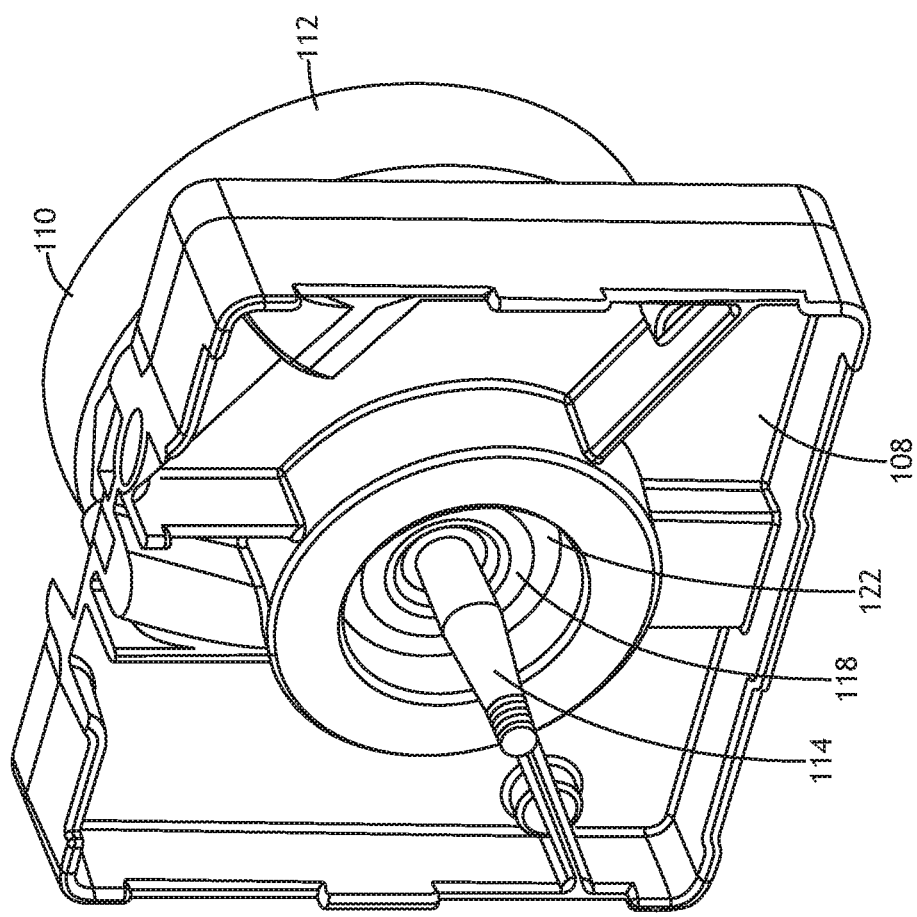
FIG. 4 is a view of an exemplary embodiment of the motor mount and motor of the system of FIG. 1 according to the inventive concepts disclosed herein.
Figure 5:
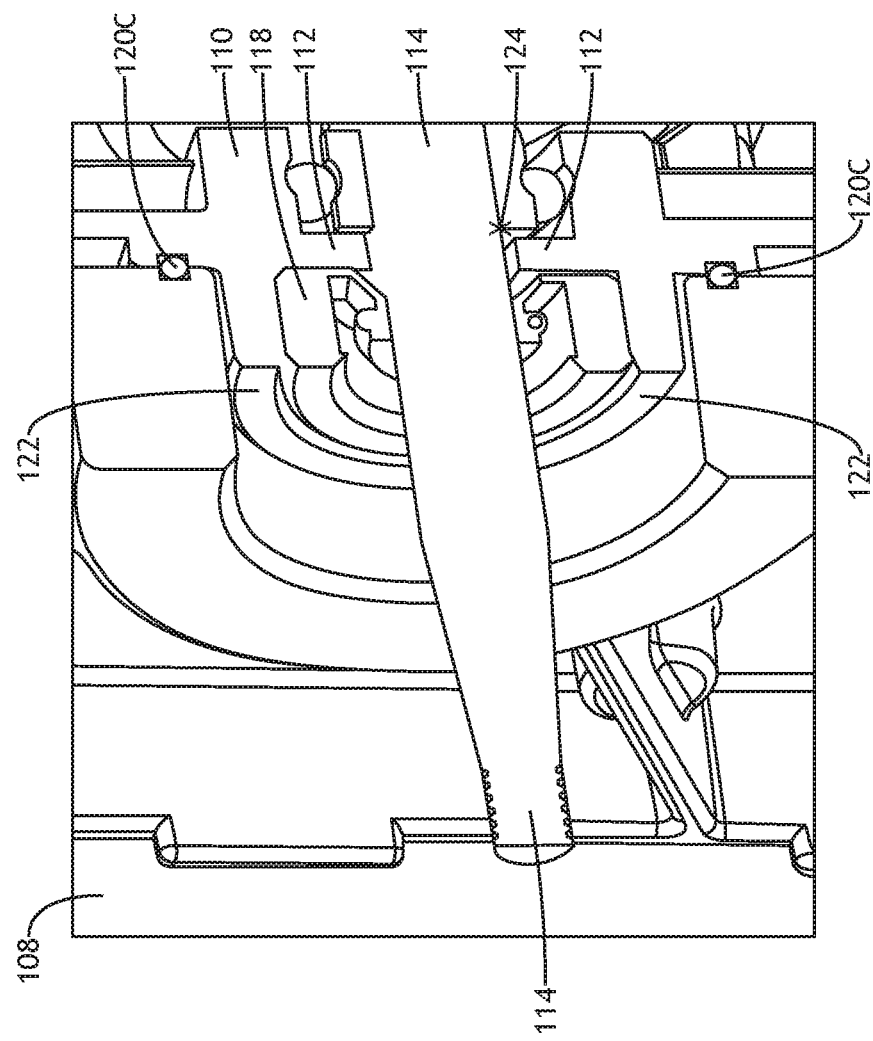
FIG. 5 is an isometric cross-sectional view of an exemplary embodiment of the motor mount and motor of the system of FIG. 1 according to the inventive concepts disclosed herein.
Figure 6:
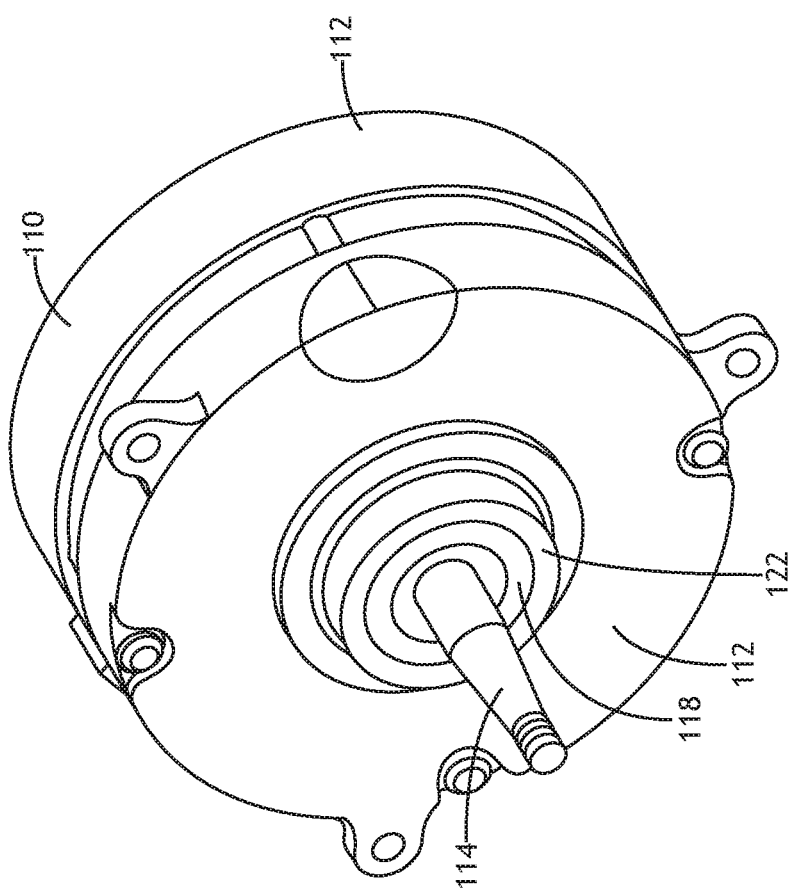
FIG. 6 is a view of an exemplary embodiment of the motor of the system of FIG. 1 according to the inventive concepts disclosed herein.
Figure 7:
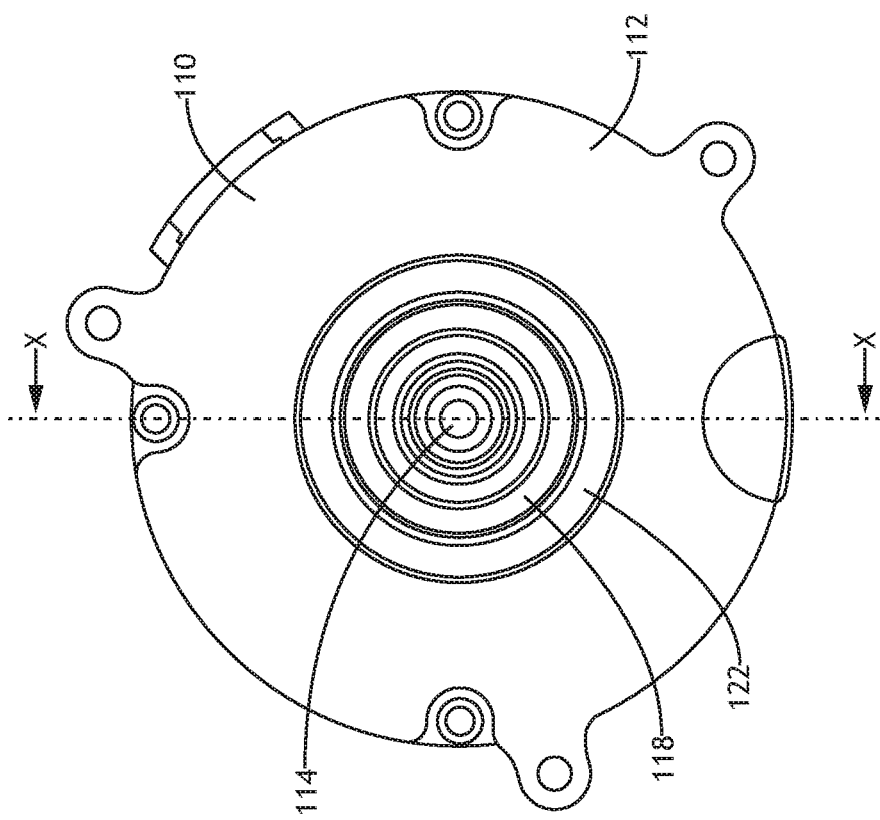
FIG. 7 is a view of an exemplary embodiment of the motor of the system of FIG. 1 according to the inventive concepts disclosed herein.
Figure 8:
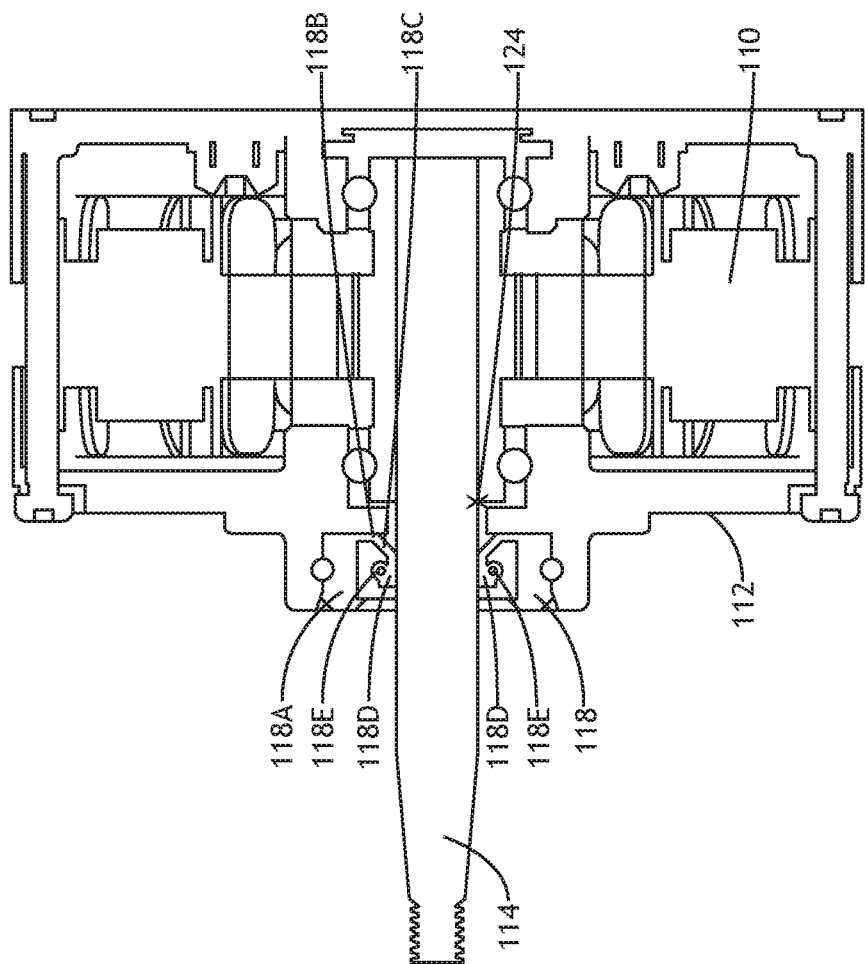
FIG. 8 is a cross-sectional view of an exemplary embodiment of the motor of the system of FIG. 1 according to the inventive concepts disclosed herein.
Figure 9:
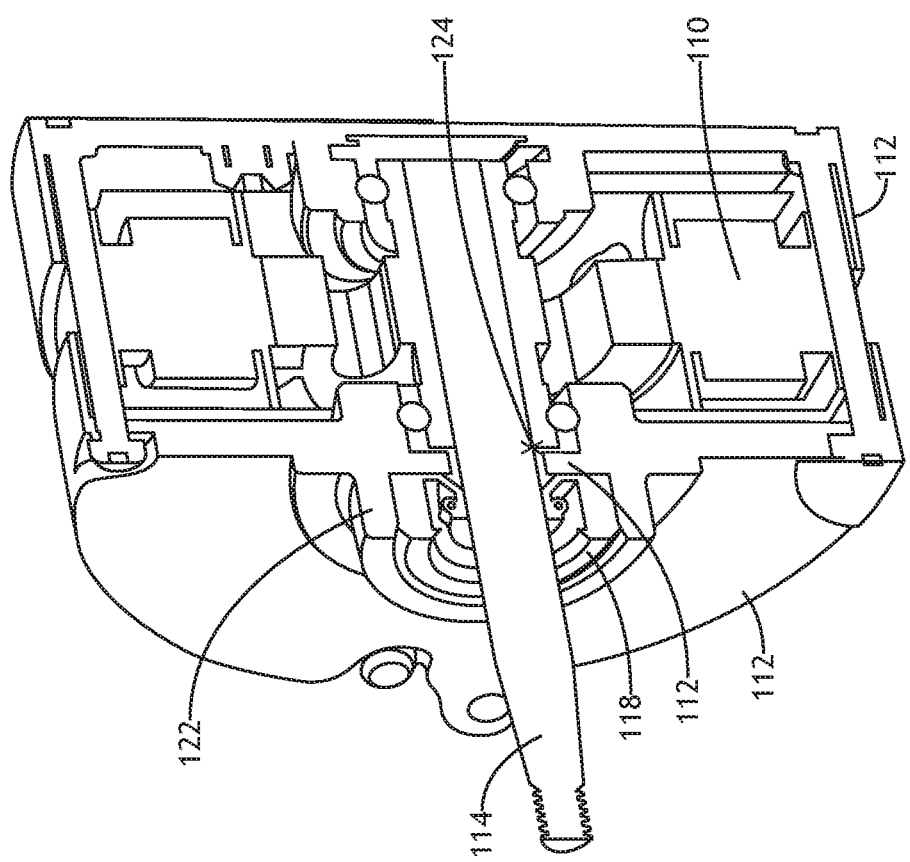
FIG. 9 is an isometric cross-sectional view of an exemplary embodiment of the motor of the system of FIG. 1 according to the inventive concepts disclosed herein.

Referring to FIGS. 3 and 5, in some embodiments, the system may include one or more static seals 120A, 120B, 120C, which may, for example, be torus-shaped seals that seal statically positioned objects. The static seals 120A, 120B, 120C may contain a cooking environment within the oven and prevent leaks. For example, the system may include at least one first static seal 120A positioned between the dynamic seal 118 and the dynamic seal seat 122, at least one second static seal 120B positioned between the aircraft galley insert motor mount 108 and the motor housing 112, and/or at least one third static seal 120C positioned between the aircraft galley insert motor mount 108 and the rear 106 of the aircraft galley oven insert 104. For example, each of the one or more static seals 120A, 120B, 120C may be torus-shaped. For example, each of the one or more static seals 120A, 120B, 120C may be formed of a flexible material (e.g., rubber or silicone).

Referring to FIGS. 3-6 and 8-12, in some embodiments, the shaft 114 may have a tapered and threaded tip configured to attach to and drive the fan (e.g., the radial fan 126) within the cavity 116 of the aircraft galley oven insert 104.

Referring now to FIG. 13, a view of an existing configuration having an existing seal location in contrast to a dynamic seal location of some embodiments is shown. For example, a distance between a closest portion of the dynamic seal 118 to the bearing point 124 may be less than 25% (e.g., less than 15% (e.g., less than 12%)) of a distance between a tip of the shaft 114 and the bearing point 124 so as to reduce an amount of deflection of the shaft 124 against the dynamic seal 118, as shown in FIGS. 1-12, as compared to a configuration (e.g., including a motor 110X, a seal 118X, a shaft 114X, and a bearing point 124X, as shown in FIG. 13) with a differently positioned seal 118X positioned farther away from the bearing point 124X. For example, during taxi, takeoff, turbulence, and landing, the aircraft 100 may be exposed to vibrations (e.g., shock). Such vibrations may be transmitted through the aircraft 100 onto galley insert equipment (e.g., the aircraft galley insert motor 110 including the shaft 114). The weight of the radial fan 126 and the shaft 114 is supported by a bearing point 124 within the aircraft galley insert motor 110. Due to a distance between the radial fan 126 and the bearing point 124, a bending load (e.g., torque) may be applied to the shaft at a position of the bearing point 124. Such bending load may result in a non-permanent deflection of the shaft 114 relative to the bearing point 124 when subjected to vibrations (e.g., shock). The deflection of the shaft 114 under such bending loads may put stress on the dynamic seal 118X (for an existing motor 110X), especially when there is already a significant misalignment present. This stress on the dynamic seal 118X can reduce a service life of the dynamic seal 118X. In some embodiments, to reduce this effect, the dynamic seal 118 may be positioned closer to the bearing point 124 (as compared to the distance between the dynamic seal 118X and the bearing point 124X). In some embodiments, such distance between the dynamic seal 118 and the bearing point 124 may result in less (e.g., minimal) deflection compared to the deflection for the distance between the dynamic seal 118X and the bearing point 124X of an existing motor 110X; such reduction in deflections can improve service life of the aircraft galley insert motor 110 and/or the dynamic seal 118.

As will be appreciated from the above, embodiments of the inventive concepts disclosed herein may be directed to a method of installing, replacing, and/or removing a dynamic seal and a system including a galley insert motor having a dynamic seal installed within a dynamic seal seat and on an exterior of a motor housing.

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system, comprising:
an aircraft galley insert having a rear side of a structure of the aircraft galley insert that comprises in an inner cavity;
an aircraft galley insert motor mount installed on the rear side of the aircraft galley insert; and
an aircraft galley insert motor installed on the aircraft galley insert motor mount, the aircraft galley insert motor comprising:
a motor housing;
a dynamic seal seat extending from an exterior of the motor housing toward the aircraft galley insert motor mount;
a dynamic seal installed within the dynamic seal seat and on the exterior of the motor housing, the dynamic seal preventing matter from the inner cavity from entering an interior of the motor housing; and
a shaft driven by the aircraft galley insert motor, the shaft extending from within the aircraft galley insert motor, through the motor housing, through the dynamic seal, and into the inner cavity of the aircraft galley insert, wherein the dynamic seal forms a seal around the shaft as the shaft is driven and as the shaft is deflected at least by gravity effects, turbulence, and vibrations,
wherein the aircraft galley insert motor has a bearing point where the shaft is subject to a dynamic bending load, wherein a distance between a closest portion of the dynamic seal to the bearing point is less than 25% of a distance between a tip of the shaft and the bearing point so as to reduce an amount of deflection of the shaft against the dynamic seal as compared to a configuration with a differently positioned seal positioned farther away from the bearing point.

2. The system of claim 1, wherein the aircraft galley insert is an aircraft galley oven insert, wherein a fan is installed within the inner cavity of the aircraft galley oven insert on an end of the shaft.

3. The system of claim 2, wherein the fan is a radial fan.

4. The system of claim 1, wherein the distance between the closest portion of the dynamic seal to the bearing point is less than 15% of the distance between the tip of the shaft and the bearing point so as to reduce the amount of deflection of the shaft against the dynamic seal as compared to the configuration with the differently positioned seal positioned farther away from the bearing point.

5. The system of claim 1, wherein the dynamic seal is replaceable without opening the motor housing.

6. The system of claim 1, further comprising at least one first static seal positioned between the dynamic seal and the dynamic seal seat.

7. The system of claim 6, further comprising at least one second static seal positioned between the aircraft galley insert motor mount and the motor housing.

8. The system of claim 7, further comprising at least one third static seal positioned between the aircraft galley insert motor mount and the rear side of the aircraft galley insert.

9. The system of claim 1, wherein the shaft has a tapered and threaded tip.

10. The system of claim 1, wherein the dynamic seal has a portion along an outer circumference that abuts the dynamic seal seat, wherein the dynamic seal has an inner circumference forming an opening that surrounds and abuts the shaft.

11. The system of claim 10, wherein the dynamic seal has an annular portion positioned between the outer circumference and the inner circumference, wherein the annular portion is parallel to the rear side of the aircraft galley insert.

12. The system of claim 11, wherein the dynamic seal has an angled annular portion positioned between the annular portion and the inner circumference, wherein the angled annular portion is angled toward the rear side of the aircraft galley insert as the angled annular portion approaches the inner circumference.

13. The system of claim 12, wherein the dynamic seal has a perpendicular annular portion positioned along the inner circumference, the perpendicular annular portion extending perpendicularly toward the rear side of the aircraft galley insert.

14. The system of claim 13, wherein the dynamic seal has a torus-shaped portion positioned around the perpendicular annular portion.

15. A system, comprising:
an aircraft galley insert having a rear side of a structure of the aircraft galley insert that comprises in an inner cavity;
an aircraft galley insert motor mount installed on the rear side of the aircraft galley insert; and
an aircraft galley insert motor installed on the aircraft galley insert motor mount, the aircraft galley insert motor comprising:
a motor housing;
a dynamic seal seat extending from an exterior of the motor housing toward the aircraft galley insert motor mount;
a dynamic seal installed within the dynamic seal seat and on the exterior of the motor housing, the dynamic seal preventing matter from the inner cavity from entering an interior of the motor housing; and
a shaft driven by the aircraft galley insert motor, the shaft extending from within the aircraft galley insert motor, through the motor housing, through the dynamic seal, and into the inner cavity of the aircraft galley insert, wherein the dynamic seal forms a seal around the shaft as the shaft is driven and as the shaft is deflected at least by gravity effects, turbulence, and vibrations,
wherein the dynamic seal has a portion along an outer circumference that abuts the dynamic seal seat, wherein the dynamic seal has an inner circumference forming an opening that surrounds and abuts the shaft,
wherein the dynamic seal has an annular portion positioned between the outer circumference and the inner circumference, wherein the annular portion is parallel to the rear side of the aircraft galley insert,
wherein the dynamic seal has an angled annular portion positioned between the annular portion and the inner circumference, wherein the angled annular portion is angled toward the rear side of the aircraft galley insert as the angled annular portion approaches the inner circumference.

16. The system of claim 15, wherein the dynamic seal has a perpendicular annular portion positioned along the inner circumference, the perpendicular annular portion extending perpendicularly toward the rear side of the aircraft galley insert.

17. The system of claim 16, wherein the dynamic seal has a torus-shaped portion positioned around the perpendicular annular portion.

* * * * *